INVENTOR.
CHARLES A. HEATH
ATTORNEYS

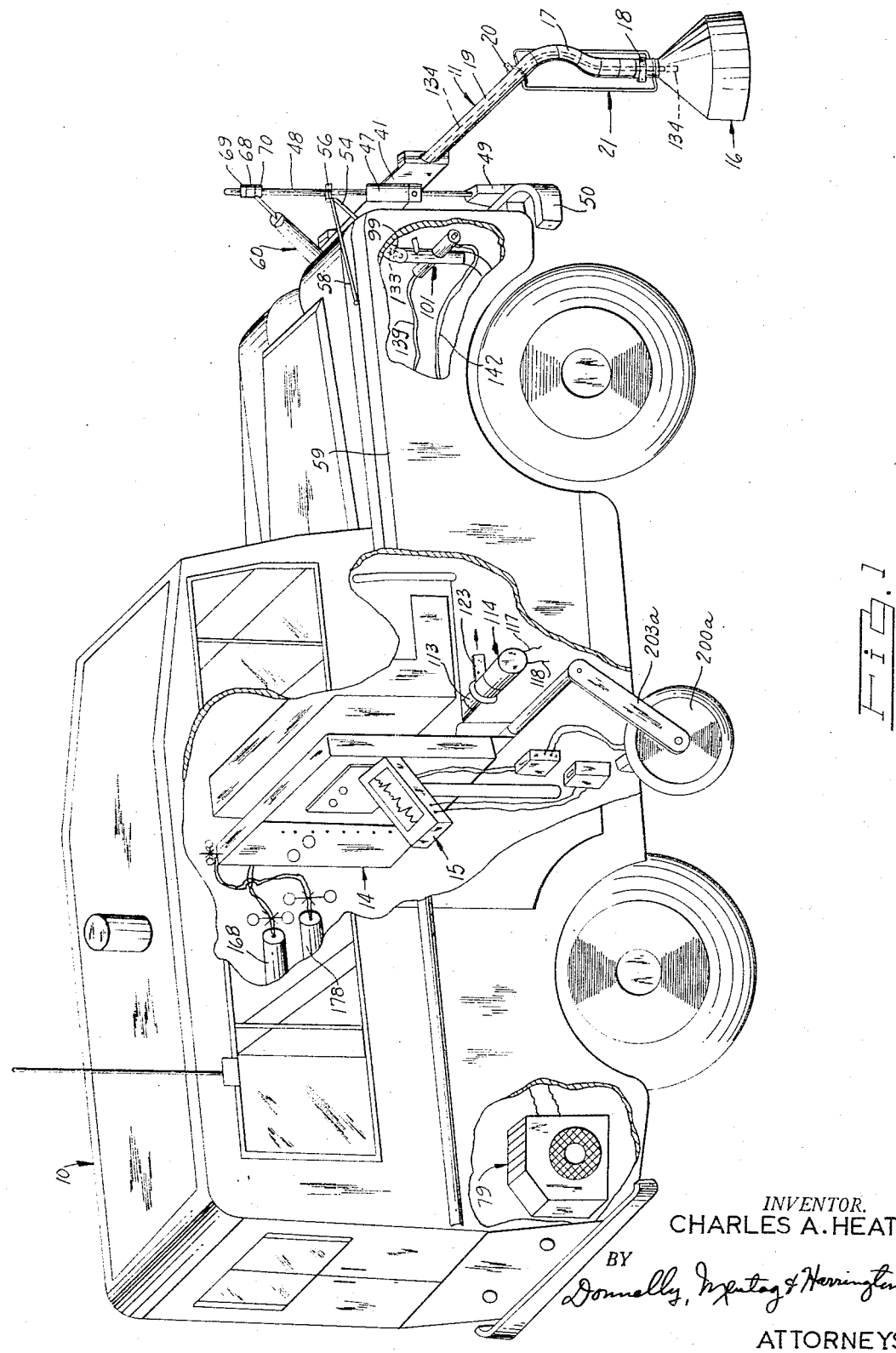

Jan. 23, 1968     C. A. HEATH     3,364,727
MOBILE GAS DETECTING UNIT
Filed Dec. 12, 1963     8 Sheets-Sheet 3
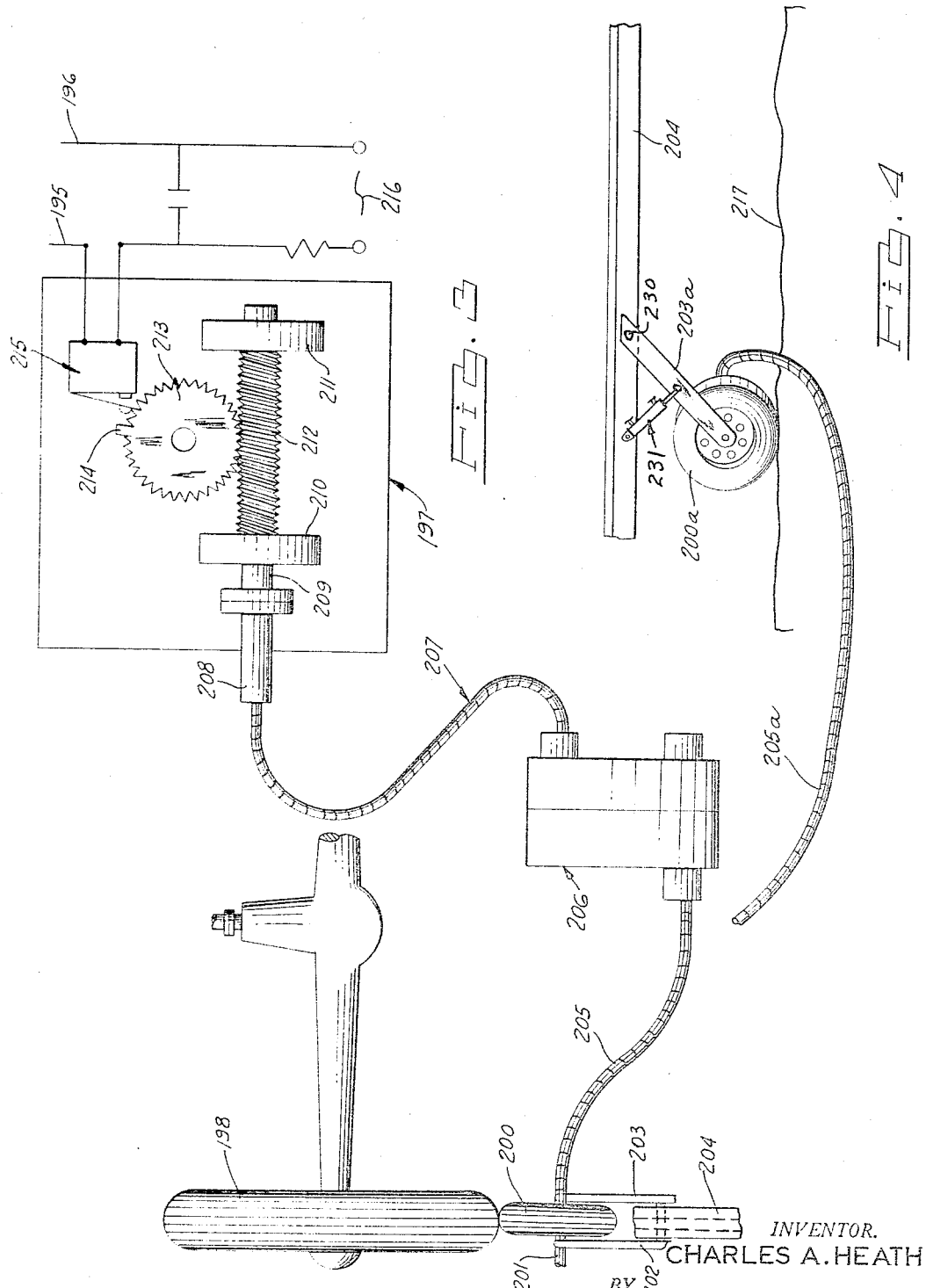
INVENTOR.
CHARLES A. HEATH
BY Donnelly, Mentag & Harrington
ATTORNEYS Jan. 23, 1968 — C. A. HEATH — 3,364,727

MOBILE GAS DETECTING UNIT

Filed Dec. 12, 1963 — 8 Sheets-Sheet 1

INVENTOR.
CHARLES A. HEATH
BY Donnelly, Mentag & Harrington
ATTORNEYS

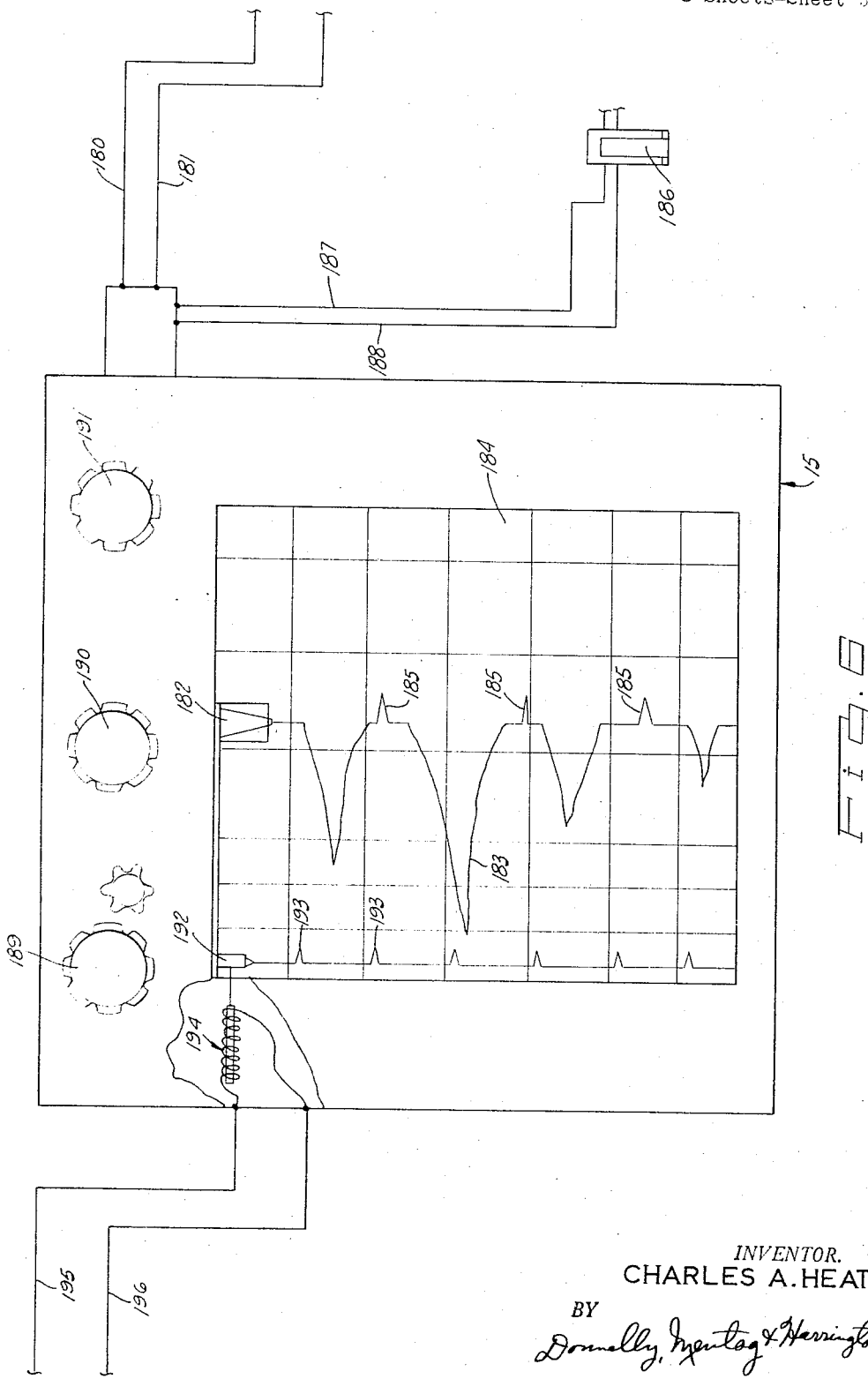

Jan. 23, 1968    C. A. HEATH    3,364,727
MOBILE GAS DETECTING UNIT
Filed Dec. 12, 1963    8 Sheets-Sheet 6
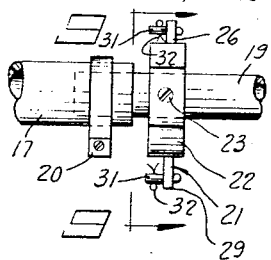
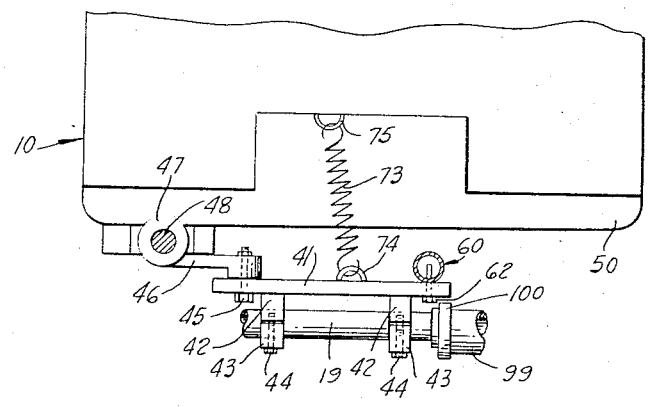
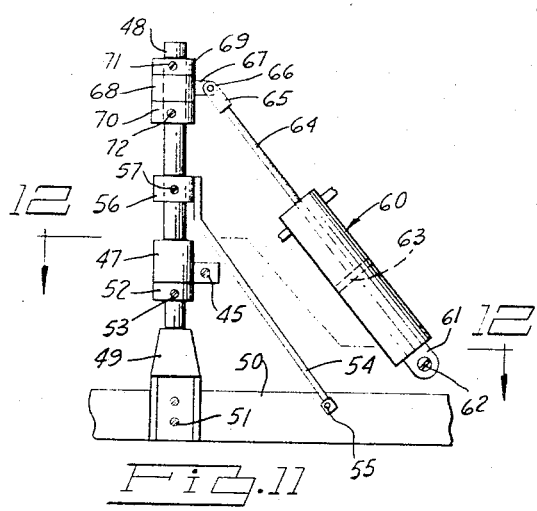
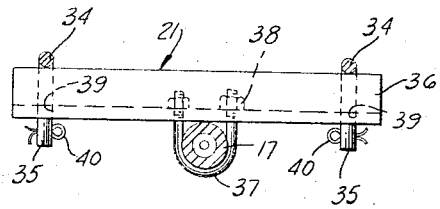
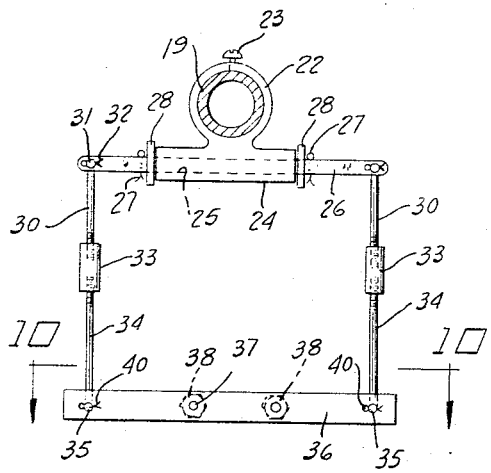
INVENTOR.
CHARLES A. HEATH
BY
Donnelly, Mentag & Harrington
ATTORNEYS Jan. 23, 1968   C. A. HEATH   3,364,727
MOBILE GAS DETECTING UNIT
Filed Dec. 12, 1963   8 Sheets-Sheet 6

INVENTOR.
CHARLES A. HEATH
BY
Donnelly, Mentag & Harrington
ATTORNEYS

United States Patent Office 3,364,727
Patented Jan. 23, 1968

3,364,727
MOBILE GAS DETECTING UNIT
Charles A. Heath, Richmond, Mich., assignor to Heath Survey Consultants, Inc., Wellesley Hills, Mass., a corporation of Massachusetts
Filed Dec. 12, 1963, Ser. No. 330,145
22 Claims. (Cl. 73—23)

This invention relates to improvements in the gas detecting art, and more particularly to a novel and improved mobile gas detecting apparatus.

Many types of mobile gas detecting units have been developed in an attempt to provide an accurate gas detector for producing a graphic record of the concentration of a given gas or gases in the atmosphere, along a preselected route. One of such mobile gas detecting units is shown in U.S. Patent No. 2,879,663. A disadvantage of such prior art gas detecting units is that the gas sample is drawn directly into an infra-red type gas analyzer to determine the concentration of the selected gas as gases to be detected, and it has been found that such gas samples drawn directly into the gas analyzer do not produce accurate results. Such prior art methods of sampling are not accurate because such samples are mixed with other gases and diluted with air which makes it impossible to accurately measure the particular gas sought to be detected and measured, as for example, methane which is the principal constituent of natural gas. Furthermore, the selectivity and sensitivity to any predetermined gas is built into an infra-red gas analyzer and major changes are necessary to change the sensitivity of such an analyzer to another gas from that for which it was designed. Accordingly, it is the primary object of the present invention to provide a novel and improved mobile gas detecting apparatus which includes an improved and efficient gas sample pickup apparatus, and means for eliminating from the sample to be analyzed objectionable or non-selected gases which do not comprise the principal gas to be detected and measured, and which may be quickly and easily changed to detect any one of a plurality of selected gases.

It is another object of the present invention to provide a novel and improved mobile gas detecting apparatus which is provided with a novel, hydraulically controlled gas sampling system which is simple and compact in construction, economical of manufacture, and efficient and accurate in operation.

It is a further object of the present invention to provide a novel and improved mobile gas detecting unit which incorporates a novel sampling boom for continuously sucking up atmospheric samples as the unit travels along a preselected route and which provides versatility to the unit, saves time and speeds up the gas sampling operation, and permits a thorough inspection over a predetermined route in a much faster time than heretofore possible with the prior art mobile gas detecting units.

It is still another object of the present invention to provide a novel and improved mobile gas detecting apparatus which incorporates an oxidizer unit which functions to burn off and eliminate gases which will burn at a lower temperature than the gas being detected, as for example, gases which will burn off at a lower temperature than methane gas, whereby the resultant oxidized gas sample is then conveyed to a flame-ionization gas analyzer, which may then function in a more sensitive, efficient and accurate manner because of the oxidized gas sample supplied to it. By lowering the temperature of the oxidizer it is possible to allow propane or butane to pass through the oxidizer for detection by the gas analyzer.

It is a further object of the present invention to provide a novel and improved method of detecting and measuring the concentration of gases by means of a mobile gas detecting apparatus and which includes novel methods of selecting and processing the gas sample to be analyzed before it is conveyed to the gas analyzer.

It is still another object of the present invention to provide a novel and improved mobile gas detecting apparatus which includes an oxidizing means for eliminating non-selected gases from the gas samples to be analyzed, and a flame-ionization detecting unit for analyzing the gas samples after they have been oxidized to detect a selected gas as methane, and wherein the gas detecting unit may be quickly and easily modified for the detection of another gas, such as propane or butane, by lowering the temperature of the oxidizer to make it possible to allow propane or butane to pass through and be detected by the flame-ionization gas detecting unit.

It is still a further object of the present invention to provide a novel and improved mobile gas detecting apparatus which incorporates an efficient sampling system comprising a primary sampling funnel in which is operatively mounted a reduced area secondary sampling pick-up means located at the throat of the funnel. A variable speed primary suction blower is connected to the funnel and it exhausts to the atmosphere. A constant speed secondary suction blower is operatively connected to the secondary sampling pick-up means. The primary sampling system functions to develop a negative pressure in the funnel and the immediate area between the lower opening of the funnel and the surface that is being sampled for leakage. This negative pressure operates to bring a gas sample into contact with the secondary sampling pick-up means. A differential in vacuum between the primary and secondary suctions is maintained at predetermined differentials in accordance with changed weather conditions. The funnel and primary sampling system increase the scope or sampling area, while the secondary sampling system carries the sample to a point near the instrument with minimum dilution and in the shortest possible time.

Other objects, features and advantages of this invention will be apparent from the following detailed description, appended claims, and the accompanying drawings.

In the drawings:

FIG. 1 is a schematic perspective view of a mobile gas detecting unit made in accordance with the principles of the present invention, and with parts of the vehicle broken away, and showing the detecting unit mounted in a motor vehicle;

FIG. 3 is a schematic view of a first embodiment of a fifth wheel apparatus for actuating the fifty-foot interval marking means, from the periphery of one of the wheels of the vehicle of FIG. 1;

FIG. 4 is a fragmentary schematic view, in perspective, of a second embodiment of a fifth wheel apparatus for actuating the fifty-foot interval marking means, by direct engagement of the fifth wheel with the ground over which the mobile gas detector moves;

FIG. 6 is a diagrammatic view of a chart recorder employed in the detecting unit of the present invention;

FIG. 8 is an enlarged fragmentary plan view of the boom structure shown in FIG. 2, taken along the line 8—8 thereof and looking in the direction of the arrows;

FIG. 9 is a fragmentary, elevational sectional view of the structure illustrated in FIG. 8, taken along the line 9—9 thereof, and looking in the direction of the arrows;

FIG. 10 is a horizontal sectional view of the structure illustrated in FIG. 9, taken along the line 10—10 thereof, and looking in the direction of the arrows;

FIG. 11 is a fragmentary enlarged view of the gas sampling boom supporting structure employed in the invention;

FIG. 12 is a fragmentary horizontal view of the structure illustrated in FIG. 11, taken along the line 12—12 thereof, and looking in the direction of the arrows;

Figure 2:
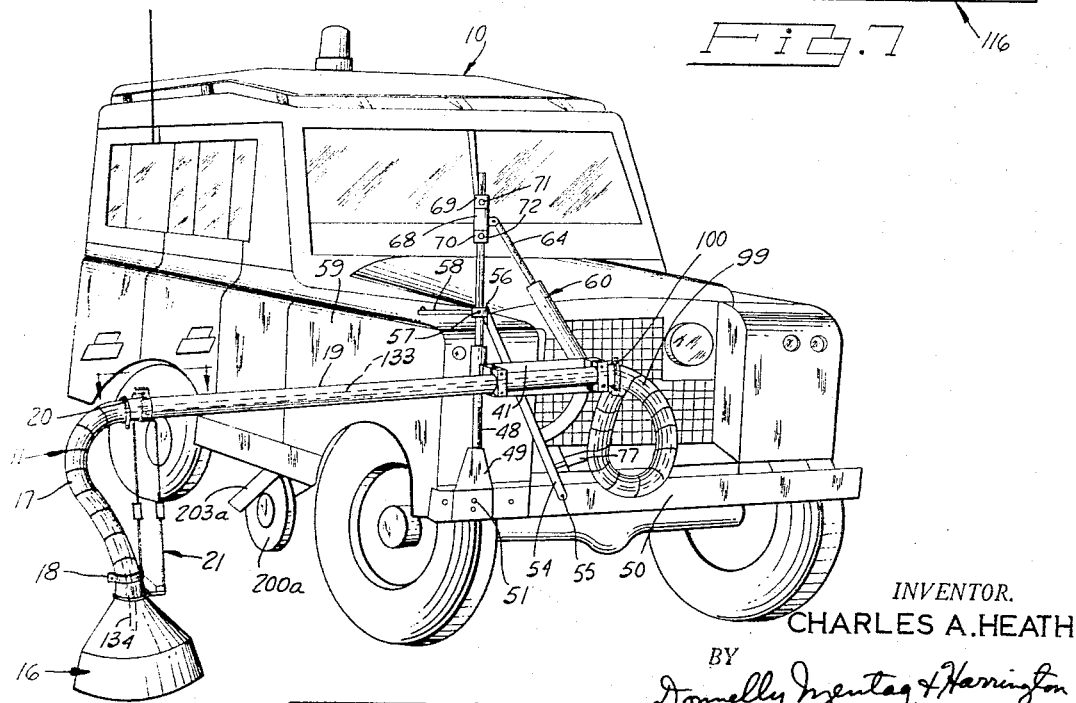
FIG. 2 is a front perspective view of the mobile gas detecting unit illustrated in FIG. 1.

Referring now to the drawings and in particular to FIGS. 1 and 2, the numeral 10 generally designates a motor vehicle in which is incorporated a gas detecting unit made in accordance with the principles of the present invention. Any suitable motor vehicle may be employed, and a four-wheeled drive vehicle is preferable. The mobile gas detecting unit of the present invention includes a hydraulically operated gas sample pick-up boom structure which is generally indicated by the numeral 11, the gas sample distribution system generally indicated by the numeral 12 in FIG. 5, and the gas oxidizer and gas analyzer generally indicated by the numerals 13 and 14 in FIGS. 1 and 5. The mobile gas detecting unit further includes a chart recorder generally indicated by the numeral 15 in FIG. 1. The operation of the aforementioned units of the mobile gas detecting apparatus are described in detail hereinafter.

As shown in FIGS. 1 and 2, the gas sample pick-up boom structure 11 includes a sampling funnel 16 which is connected at its upper end to the lower end of a suitable flexible conduit or tube 17 by any suitable means, as by the hose clamp 18. The upper end of the flexible conduit 17 is connected by means of the hose clamp 20 to the outer end of the transversely disposed rigid conduit or pipe 19 on the front end of the vehicle 10.

The funnel 16 is supported by a flexible suspension means generally indicated by the numeral 21 in FIGS. 1, 2, 8, 9 and 10. The suspension means 21 is free to swing in any direction and maintain the bottom of the funnel on an even plane for uniform suction of the gas samples from the atmosphere. The funnel 16 is thus supported for universal adjustability in case it hits an object as the vehicle 10 moves along its preselected survey route. As best seen in FIGS. 8, 9 and 10, the flexible suspension means 21 includes the collar 22 which is mounted on the outer end of the boom pipe 19 and secured in place by any suitable means, as by a lock screw 23. Integrally formed on the lower side of the collar 22 is a horizontal journal member 24 through which is formed the bore 25 at a position transverse to the longitudinal axis of the boom pipe 19. Rotatably mounted in the bore 25 is the transversely disposed shaft 26 which is held against axial movement by any suitable means, as by the cotter keys 27 and washers 28.

As shown in FIG. 8, a hole 29 is formed through the shaft 26 at each end thereof and these holes are disposed parallel to the longitudinal axis of the boom pipe 19. The flexible suspension means 21 further includes the pair of rods 30 which are provided on the upper ends thereof with the right angle turned portions 31, as shown in FIGS. 8 and 9. The rod portions 31 are rotatably mounted in the holes 29 and are retained in place by any suitable means, as by the cotter keys 32. The lower ends of the rods 30 are threaded, and threadably mounted thereon are the threaded connector members 33. Threadably mounted in the lower ends of the connector members 33 are a pair of rods 34 which are similar to the rods 30 and which have a reverse thread on the upper ends thereof whereby when the connector members 33 are turned in an appropriate direction, they will either draw the rods 34 upwardly toward the rods 30, or they will separate said rods, as desired. The lower ends of the rods 34 are turned outwardly at right angles thereto as indicated by the numerals 35. The suspension means 21 further includes the horizontally disposed channel member 36 which is secured to the upper end of the funnel 16 by any suitable means, as by means of the U-bolt 37 and the lock nuts 38. The right angle rod ends 35 are adapted to be rotatably mounted in the holes 39 which are formed through the vertical wall of the channel 36. The holes 39 are disposed in parallel alignment with the holes 29 in the upper shaft 26. The rod ends 35 are secured in the channel 36 by means of the cotter keys 40.

As best seen in FIGS. 2 and 12, the boom pipe or conduit 19 is adjustably mounted on the vertical boom carrier plate 41 which is normally disposed in a horizontal position. Fixedly mounted on the front side of the plate 44 by any suitable means, as by welding, is a pair of U-shaped clamp members 42 which are adapted to slidably receive the inner side of boom pipe 19. A pair of mating U-shaped clamps 43 are adapted to enclose the outer side of the pipe 19 and to be releasably secured to the clamp members 42 by means of the bolts 44.

The vertical plate 41 is hingedly connected to the bracket arm 46 by means of the bolt 45. The bracket arm 46 is fixed to the sleeve 47. The sleeve 47 is rotatably mounted on the vertical boom supporting post 48 so as to permit the plate 41 to be swung on a horizontal plane about the post 48. As best seen in FIG. 11, the lower end of the post 48 is fixedly secured to a mounting bracket 49 by any suitable means, as by welding. The mounting bracket 49 is fixedly secured to the front bumper 50 of the vehicle by any suitable means, as by the rivets 51. The sleeve 47 is held in a vertically adjusted position on the post 48 by means of the collar member 52 which may be secured in an adjusted position on the post 48 by means of the lock screw 53.

As shown in FIGS. 1 and 2, the post 48 is further supported by the diagonal brace 54 which is secured to the front bumper 50 by any suitable means, as by the rivet 55. The upper end of the brace 54 is welded to the collar 56 which is secured in place on the post 48 by means of the lock screw 57. A rearwardly extended diagonal brace 58 has the front end thereof fixedly secured to the collar 56 and the rear end thereof welded to the front fender 59 of the vehicle.

As shown in FIGS. 2, 11 and 12, the boom carrier plate 41 is adapted to be maintained in any desired adjusted pivoted position relative to the pivot bolt 45 by means of the hydraulic cylinder generally indicated by the numeral 60. The lower end of the hydraulic cylinder 60 is provided with the attachment bracket 61 for pivotally attaching the cylinder to the inner end of the plate 41 by any suitable means, as by means of the pivot pin or bolt 62. The hydraulic cylinder 60 is provided with the usual piston 63 and the piston rod 64. The piston rod 64 extends upwardly from the cylinder and is provided on the upper end thereof with the yoke member 65. The yoke member 65 is pivotally mounted at the point 66 to the bracket 67 carried on the collar 68. The collar 68 is rotatably mounted on the upper end of the post 48 and is retained in an adjusted position on the post against vertical movement by means of the retainer collars 69 and 70 which are secured on the post 48 by means of the lock screws 71 and 72, respectively.

The pick-up boom carrier plate 41 is adapted to be normally biased inwardly, to the position shown in FIGS. 1 and 2, by means of the tension spring 73 which is shown in FIG. 12. One end of the spring 73 is attached to the inner side of the plate 41 by an suitable means, as by means of the U-bolt 74. The inner end of the spring 73 is attached to the front end of the vehicle 10 by any suitable means, as by means of the U-bolt 75. It will be seen that if the funnel 16 strikes an object, the plate 41 will be moved clockwise, as viewed in FIG. 12, and it will be returned to the position shown in FIG. 12 by means of the tension spring 73 after the funnel 16 has cleared said object.

Figure 13:
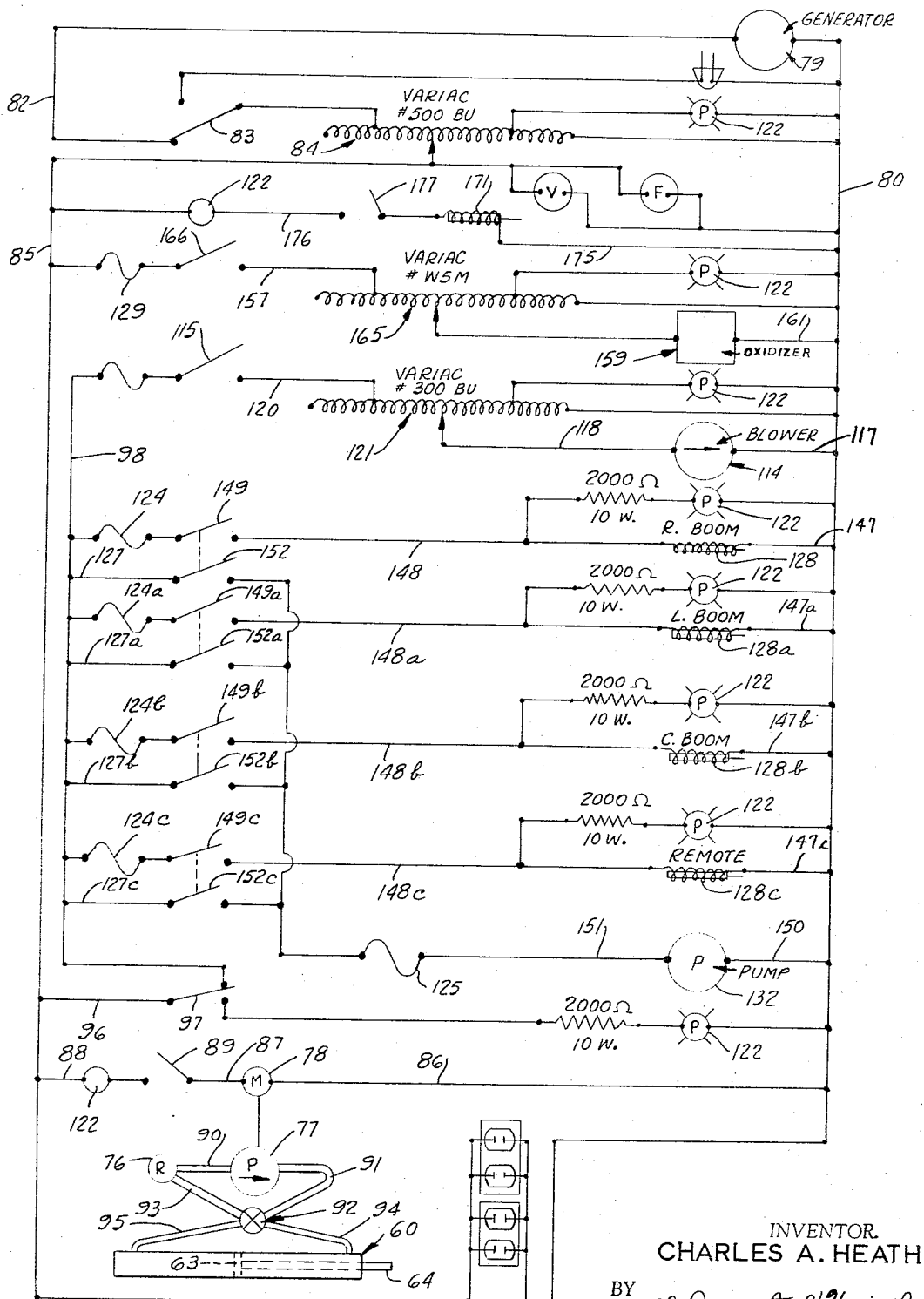
FIG. 13 is a schematic view of an illustrative wiring diagram for the detecting unit of the present invention.

The hydraulic cylinder 60 may be operated by means of a remote control from the inside of the vehicle 10. As shown in FIG. 13, the hydraulic cylinder 60 may be supplied with hydraulic fluid from a suitable reservoir 76 by means of the pump 77 which is driven by a suitable electric drive motor 78. The drive motor 78 is powered from a suitable portable source of 110-volt electrical energy, as for example the generator 79, which would be located in a suitable position in the vehicle 10. The ground lead of the generator 79 is connected to the power supply line 80. The other lead of the generator 79 is connected by the lead wire 82, master switch 83, and a suitable variable resistor 84, to the other power supply line 85.

The power supply lines 80 and 85 are connected to the motor 78 by means of the lead wires 86, 87 and 88 and the switch 89. The pump 77 would draw hydraulic fluid from the reservoir 76 by means of the contduit 90 and deliver it to the pressure fluid conduit 91 which is connected to the fourway flow control valve 92. The fluid would be exhausted from the valve 92 by means of the exhaust conduit 93 which is connected to the reservoir 76. The fourway valve 92 may be disposed in the vehicle 10 at any desired position for remotely controlling the operation of the cylinder 60, to raise or lower the boom 19 as desired. The valve 92 controls the feeding and exhausting of the hydraulic fluid to the desired end of the cylinder 60 through the conduits 94 and 95. The pick-up boom pipe 19 may be made to any desired length. In some models it has been found that a boom pipe 19 of about six feet in length is desirable so that it may extend about five feet outwardly from the side of the vehicle 10. The hydraulic pump 77 may be disposed in any suitable position in the vehicle 10, as for example, it may be disposed on the front end of the vehicle, as shown in FIG. 2.

Figure 5:
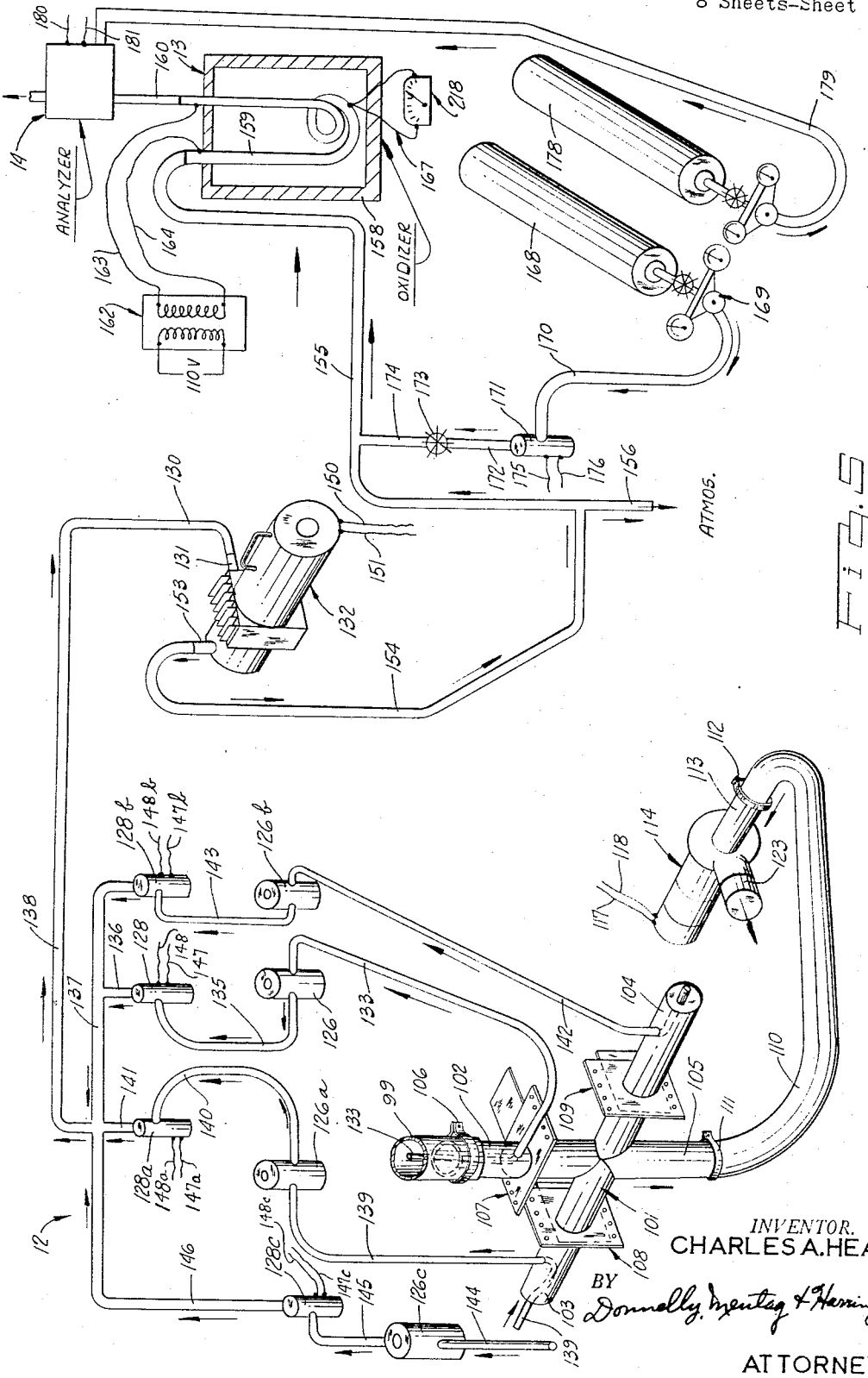
FIG. 5 is a schematic view of a gas sampling system for use with the present invention.

As shown in FIG. 2, the outer end of a second flexible conduit or tube 99 is connected to the inner end of the boom pipe 19 by means of the hose clamp 100. The flexible conduit 99 is connected at the other end thereof to the inlet valve 101 of the gas sampling system shown in FIG. 5. The valve 101 is a three-way flow control valve which is preferably mounted on the front of the vehicle 10, in front of the radiator. However, it should be understood that the valve 101 may be mounted in any suitable position on the vehicle 10. The gas sampling system inlet valve 101 is provided with the three large inlet tubes 102, 103 and 104, and the outlet tube 105. As best seen in FIG. 5, the inner end of the flexible conduit 99 is connected to the inlet tube 102 by means of the hose clamp 106.

It will be understood that the aforedescribed gas sample pick-up boom is illustrative of the type boom which may be connected to each one of the three inlets 102, 103 and 104 on the valve 101. FIGS. 1 and 2 show such a pick-up boom mounted on the right side of the vehicle and a similar boom would be mounted on the left side of the vehicle and on the center of the vehicle.

The valve inlets 102, 103 and 104 are provided with suitable gate valves generally indicated by the numerals 107, 108 and 109. It will be understood that any suitable type of valve may be employed to carry out the function of said gate valves, and that they may be manually or automatically operated so that any desired inlet may be selectively operated. As shown in FIG. 5, one end of a flexible conduit 110 is connected by means of the hose clamp 111 to the discharge end of the valve tube 105. The other end of the conduit 110 is connected by means of the hose clamp 112 to the inlet 113 of the suction blower 114. The suction blower 114 may be of any suitable type and is adapted to draw a gas sample through a primary sampling system comprising the funnel 16, the conduit 17, the boom pipe 19, the conduit 99, the inlet valve 101, and the connecting conduit 110. The suction blower 114 may be termed the primary sampling pump and it exhausts to the atmosphere only through the outlet 123.

Figure 7:
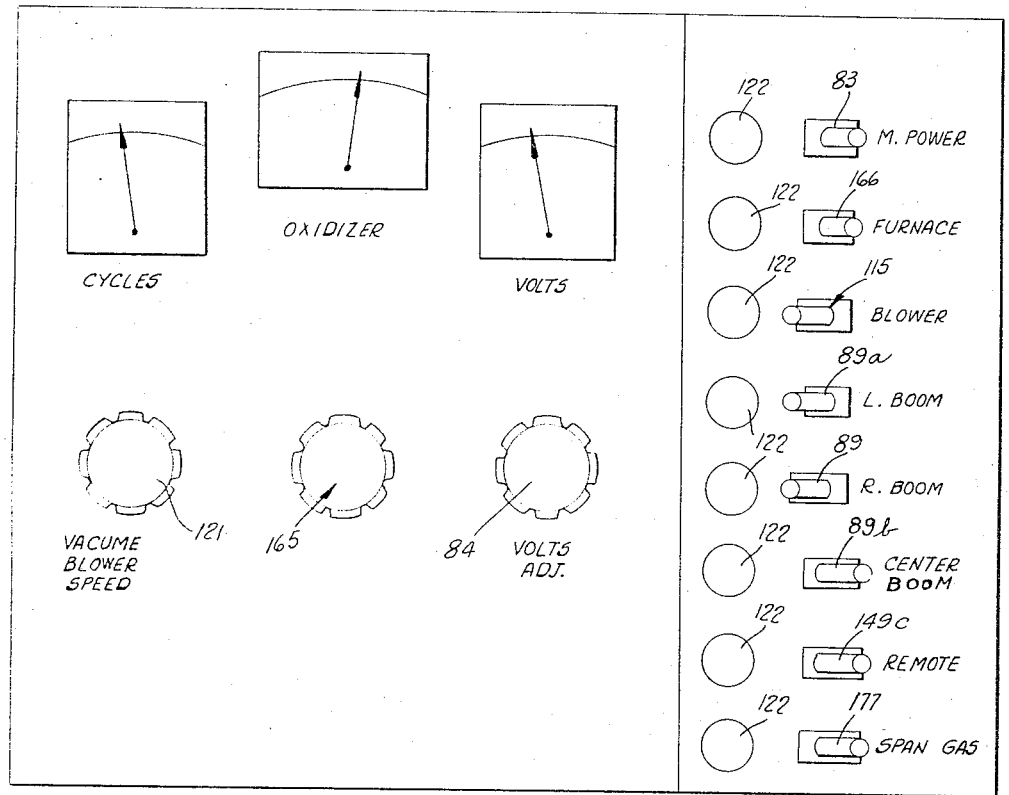
FIG. 7 is a diagrammatic view of a switchboard for use in the present invention.

As shown in FIGS. 7 and 13, the blower 114 may be controlled by a switch 115 mounted on a control panel 116. The lead wire 117 connects one side of the blower 114 to the power line 80. The other side of the blower motor is electrically connected to the power line 85 by means of the lead wires 96, 98 and 120, the fuse 119, switch 115, and the variable resistor 121. The numeral 122 indicates signal lights throughout the various parts of the circuit of FIG. 13.

The primary sampling pump 114 is preferably a universal variable speed type motor and its speed may be varied by the series connected voltage regulator 121 for varying the rate of flow of the primary gas sample through the primary sampling system, as more fully explained hereinafter. A suitable pump 114 is a conventional vacuum sweeper blower having a capacity of from 3000 to 6000 cubic feet per minute.

As shown in FIGS. 1 and 2, the secondary sampling system includes a reduced diameter flexible hose or tube 133 disposed inside of the boom pipe 19 and the flexible tubes 17 and 99. The outer end of the flexible hose 133 is connected to an intake nozzle which is disposed in the throat of the funnel 16. As shown in FIG. 5, the reduced diameter hose 133 extends into the flow control valve inlet 102, and it extends out through the side of the inlet 102 and is connected to the conventional filter 126. The hose 133 emerges from the flow control valve inlet tube 102 on the outer side of the gate valve 107. The filter 126 is connected by means of the conduit 135 to the electrically operated solenoid valve 128 which is in turn connected by means of the flexible conduits 136, 137, 138 and 130, to the inlet 131 of the secondary sampling suction pump 132. The pump 132 is a constant speed pump of any suitable type, as for example, it may be a carbon vane or diaphragm type, sealed pump. A suitable piston pump is one sold by Bell and Gossett Company of Morton Grove, Ill., Model SYC-LV.

As shown in FIG. 5, the flow control valve inlet 103 is provided with an internally mounted reduced diameter sampling hose 139 which is similar in structure and function to the sampling hose 133. The sampling hose 139 emerges from the inlet 103 and is connected to the conventional filter 126a. The filter 126a is connected to the secondary pump inlet 131 by means of the conduits 140, 141, 138 and 130, and the electrical solenoid operated valve 128a. The flow control valve inlet tube 104 is provided with a similar reduced diameter sampling tube 142 which is connected to the filter 126b. The filter 126b is connected by means of the flexible tube 143 to the electric solenoid valve 128b. The solenoid valve 128b is connected by means of the flexible conduits 137, 138 and 130 to the inlet 131 of the secondary suction pump 132.

The secondary sampling system of FIG. 5 is adapted to be connected to a remote gas sample pick-up or probe for checking off-street areas. The numeral 144 indicates a flexible gas sample hose which may be connected at one end thereof to a remote probe and at the other end thereof to the conventional filter 126c. The filter 126c is connected to the secondary suction pump 132 by means of the conduits 145, 146, 138, 130 and the electric solenoid valve 128c. The remote probe would be constructed in the same manner as the probe 16, and would be connected to pick-up primary and secondary gas samples.

As shown in FIG. 13, the solenoid valves 128 through 128c are each connected to the power lines 80 and 98 by the lead wires 147 through 147c, the lead wires 148 through 148c, the switches 149 through 149c, and the fuses 124 through 124c. The last mentioned circuits may each be provided with an indicator light 122.

As shown in FIGS. 7 and 13, the secondary pump 132 would be connected to the power lines 80 and 98 by means of the lead wires 150 and 151, fuse 125, switches 152 through 152c, and lead wires 127 through 127c. It will be seen that the secondary pump 132 is connected in parallel with the sample line solenoids 128 through 128c and it operates only when any one of these solenoids are open, because the switches 149 are interconnected with the switches 152. The control switch 89 for the right boom may also be located on the control board 116. Switches 89a and 89b for the left and center booms, if used, may also be mounted on the control board 116. The left and center booms would be connected to the control valve inlets 103 and 104, respectively.

As shown in FIG. 5, the secondary sampling pump 132 delivers a gas sample to the oxidizer 13 by means of the outlet 153 and the conduits 154 and 155. The conduit 154 is connected to the atmosphere by means of the discharge conduit 156.

The oxidizer of furnace 13 is adapted to burn off the heavy hydrocarbons of exhaust gases which may be in the gas samples drawn through the secondary sampling system, and it may be of any suitable type. The oxidizer 13 burns off objectionable gases at a temperature lower than the burning temperature of the selected gas, as methane, so as to allow the selected gas to pass through the oxidizer to the gas analyzer 14.

The oxidizer 13 is schematically illustrated and comprises an insulated container 158 in which is mounted the U-shaped metal tube 159 which is made from "Inconel" (a trademark) metal or any other suitable metal. One end of the metal tube 159 is connected to the non-conductive inlet tube 155 and the other end thereof is connected to the analyzer non-conductive inlet tube 160. Both ends of 159 are electrically insulated from the tubes 155 and 160. The metal tube 159 has a high resistance characteristic and is used as a heating element. The metal tube 159 is connected to a source of electrical power by means of the transformer 162 and the lead wires 163 and 164. The transformer 162 is connected to the power lines 80 and 85 by means of the variable resistor 165 and the switch 166 and lead wires 157 and 161, and fuse 129. The temperature in the oxidizer 13 is controlled by the variable resistor 165 which may be controlled from the control board 116. The diameter and length of the tube 159 is calibrated so that a low voltage-high amperage current applied across the inlet and outlet of the tube will provide temperature ranges adequate for burning off the objectionable gases. The resistor 165 regulates the primary side of the transformer 162 to obtain the low voltage amperage current. The temperature inside of the oxidizer 13 can be checked by any suitable means, as for example, by the thermocouple 167 as shown in FIG. 5. The thermocouple 167 is operatively connected to the meter 218 to provide for accurate regulation of the temperature of the oxidizer. The meter 218 is calibrated to read the thermocouple output directly in temperature.

As shown in FIG. 5, the numeral 168 indicates a cylinder of span gas comprising methane mixed with air for supplying the same to the oxidizer 13 for calibrating the analyzer 14. The cylinder 168 is connected to the oxidizer 13 by means of a control valve 169, the conduit 170, the electrically operated solenoid valve 171, the conduit 172, hand valve 173 and conduits 174 and 155. The solenoid valve 171 would be connected to the power lines 80 and 85, as shown in FIG. 13, by means of the lead wires 175 and 176 and the control switch 177.

The gas analyzer 14 may be any suitable high sensitivity methane detector capable of detecting methane in the range of about one part methane in a million parts of the gas sample. Preferably, the gas analyzer should be a flame-ionization analyzer. A suitable flame-ionization analyzer is one made by the Davis Emergency Equipment Company, Newark, N.J., Model No. 11–6505.

As shown in FIG. 5, the numeral 178 indicates a hydrogen supply cylinder which is adapted to feed hydrogen through the conduit 179 to the analyzer 14 as fuel for the flame-ionization cells. The output voltage from the analyzer 14 is transmitted by means of the lead wires 180 and 181 into the recorder 15. The recorder 15 may be of any suitable type, which is equipped with an extra stylus as 192, for use in connection with the fifty-foot recording device, as more fully explained hereinafter. The input signal from the gas analyzer is conducted to the stylus 182 which operates in the usual manner to draw an ink strip 183 on the moving chart paper 184 of the recorder 15. As shown in FIG. 6, the variations in the path traced by the stylus 182 which extend to the left on the chart paper, indicate the concentration of the methane gas or other gas being detected. The marks 185 which are made toward the right side of the paper indicate a reference mark, as for example, a building or a given street number along the survey route. The chart paper 184 may be calibrated so that the full width of the paper would indicate a certain concentration of methane in the sample. As, for example, one hundred parts per million parts of sample could be equivalent to a full sweep of the stylus 182 across the entire width of the chart paper. The mark 185 could be selectively made by means of a foot pedal 186 which would be connected to a suitable source of power to insert a reverse or negative signal through the lead lines 187 and 188 into the recorder circuit of the stylus 182. The stylus 182 maintains a straight line until methane is detected and then it moves sidewardly in proportion to the concentration of methane in the sample.

The recorder 15 is provided with the usual controls and moves the paper 184 at a constant speed. The numeral 189 indicates the on-off switch. The numeral 190 indicates the input selector switch. This provides the necessary input connections to obtain a 10 millivolt range on the recorder span. The numeral 191 indicates a control means for controlling the zero setting of the operating stylus 182.

As shown in FIG. 6, the numeral 192 indicates a second stylus which is adapted to make a mark on the chart paper 184 for a predetermined unit of travel, as every fifty foot travel of the vehicle 10. The stylus 192 makes a mark as 193 when it is energized sidewardly by the electrical solenoid generally indicated by the numeral 194. The solenoid 194 would be energized by an impulse signal sent to it through the lead wires 195 and 196 from the travel impulse generator generally indicated by the numeral 197 in FIG. 3.

In FIG. 3, the numeral 198 indicates one of the drive wheels of the vehicle 10. A take-off wheel 200 is adapted to engage the periphery of the drive wheel 198 and be driven thereby. The take-off wheel 200 is rotatably mounted on a suitable shaft 201 which is supported by the arms 202 and 203 from the vehicle frame 204. The circumference of the take-off wheel 200 is such that when used in conjunction with the gear reducer 206, the angular output of the gear reducer will have one rotation for each linear foot traversed by the vehicle 10. It does not make any difference what the circumference of the vehicle wheel 198 comprises. A flexible drive shaft 205 is connected to one end of the take-off wheel shaft 201 by any suitable means, and the other end of the flexible shaft 205 is connected to the input shaft of a suitable gear reducer generally indicated by the numeral 206. A second flexible shaft 207 is connected at one end thereof to the output shaft of the gear reducer 206 and at the other end thereof to the input shaft 208 of the impulse generator 197. The input shaft 208 is connected to a drive shaft 209 which is journalled in the supports 210 and 211. The shaft 209 is connected to a worm gear 212 which is meshably engaged with a pinion 213. The pinion 213 is provided with a switch operating arm 214 for operating the micro-switch 215 upon one complete turn of the pinion 213. The micro-switch 215 controls the flow of direct current electrical power from a suitable source through the lead wires 195 and 196 to the distance marking stylus 192 (FIG. 6). The source of DC power is indicated by the numeral 216 in FIG. 3.

The gear reduction ratio of the gear reduction unit 206 and the size of the circumference of wheel 200 are selected to provide a proper calibration for the impulse generator whereby the input to worm 212 makes one complete revolution for each one foot travel of the vehicle 10. Therefore, fifty turns of the worm 212 will rotate the pinion 213 one complete revolution to actuate the microswitch 215 once for every fifty foot travel of the vehicle. The stylus 192 makes a vertical line, as shown in FIG. 6, until it is given an impulse from the generator 197 whereby it makes the horizontal mark 193 to indicate fifty feet of vehicle travel. As the vehicle goes faster the fifty foot marks 193 will be closer together on the chart paper 184. The chart paper 184 is run at a constant speed and this speed can be any value just as long as it is consistent.

FIG. 4 indicates a modified take-off wheel construction in which the take-off wheel 200a is adapted to engage the ground 217 over which the vehicle is traveling. The take-off wheel 200a is connected to the vehicle frame 204 by means of a pair of support arms 203a and the hinge pin 230. The wheel 200a drives the flexible cable 205a for generating an impulse current in the same manner as described for the embodiment of FIG. 3. The wheels 200 and 200a may be raised and lowered into operative position by any suitable means, as by the hydraulic motor 231 shown in FIG. 4.

Figure 14:
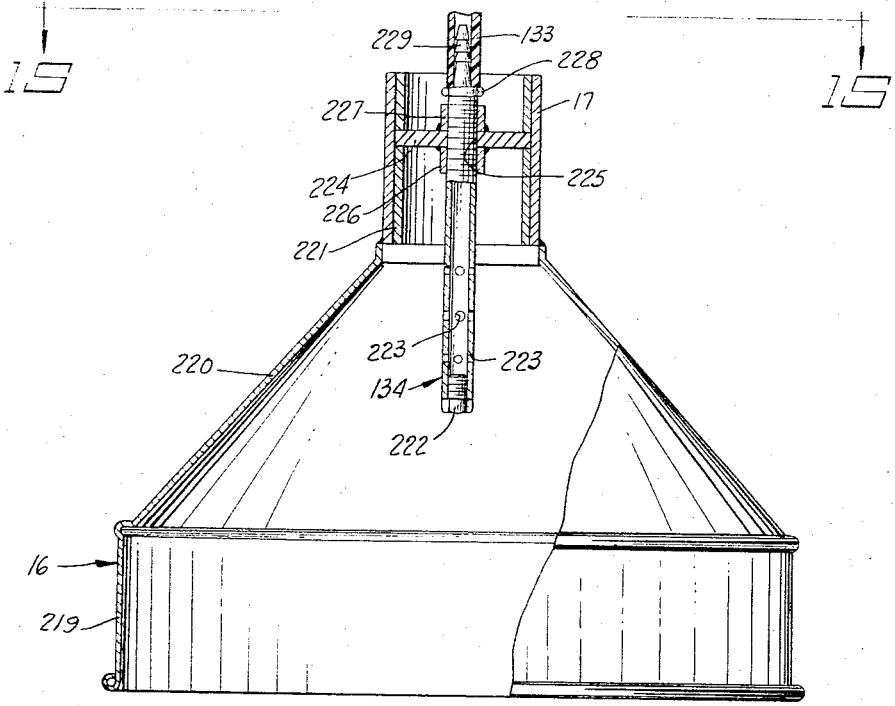
FIG. 14 is a central elevational view of a primary sampling funnel employed in the invention; and, FIG. 15 is a top plan view of the structure illustrated in FIG. 14, taken along the line 15—15 thereof, and looking in the direction of the arrows.
Figure 15:
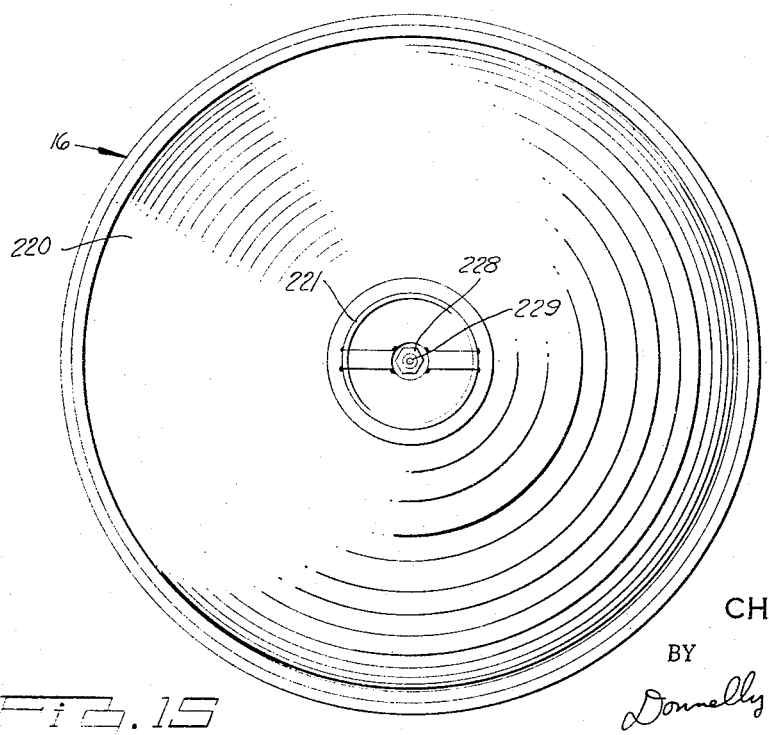

FIGS. 14 and 15 illustrate a preferred sampling funnel which shows the secondary sampling pick-up nozzle 134 located at the throat of the funnel 16. As shown in FIG. 14, the funnel 16 comprises the cylindrical intake portion 219 which is approximately ten inches in diameter and 2⅜″ high. Integrally connected to the upper end of the portion 219 is the upwardly converging throat portion 220. Fixedly connected to the upper end of the throat portion 220 is the connector pipe 221 to which is connected the flexible tube 17.

The nozzle 134 is preferably made from ½″ brass pipe and is enclosed at the lower end thereof with a threadably mounted screw 222. As shown in FIG. 14, the lower end of the nozzle extends partially into the funnel throat portion 220 and the nozzle portion in the throat 220 is provided with a plurality of ⅛″ diameter holes 223 which are formed through the side walls of the nozzle 134. A cross-bar 224 is fixedly mounted in the connector pipe 221 and is provided with a threaded hole 225 in which is threadably mounted the upper threaded end of the nozzle 134. The nozzle is adjustably secured in place in the member 224 by means of the tubular connector members 226 and 227 which are formed as threaded sleeves and welded to the upper and lower sides of the cross member 224. A lock nut 228 fixedly secures the nozzle 134 in an adjusted position. The upper end 229 of the nozzle 134 is provided with a plurality of serrations for gripping the secondary suction hose 133.

It will be understood that the flame-ionization detecting instrument 14 is sensitive to all hydro-carbons. It is a carbon atom counter. By controlling the temperature of the oxidizer 13 to the point where only methane gas can pass through the flame-ionization unit 14, this unit becomes selective to methane. By lowering the temperature of the oxidizer 13, it is possible to allow propane or butane gas to pass through and be detected on the flame-ionization unit 14. This function is not possible with an infra-red type detector where selectivity and sensitivity to any predetermined gas must be built into the instrument. Major changes are necessary in order to convert the sensitivity of an infra-red detector to another gas than that for which it was designed. It is thus seen that the combination of the oxidizer 13 and the flame-ionization unit 14 provides a detecting unit which is flexible and can be quickly changed to any sensitivity desired to detect a plurality of gases.

It will further be seen that the secondary sample pump 132 exhausts to the atmosphere and it is used only to transfer the gas sample from the nozzles 134 in the funnels 16 to a point near the oxidizer 13 as rapidly as possible. The minimum delay in transferring the gas sample through the secondary sampling system to the oxidizer promotes more accurate plotting of gas leaks. The percentage of error is reduced in proportion to the increase in speed and response of the entire detecting system.

The actual gas sample which is analyzed by the analyzer 14 is taken at the junction of the conduits 154 and 155 where the secondary pump 132 exhausts to the atmosphere. The analyzer sample is pulled through the ionization cell of the flame-ionization instrument by a third built-in pump and, therefore, the sample is below atmospheric pressure as it passes through the analyzer 14. The span gas from the cylinder 168 is also introduced to the conduit 155 against only atmospheric pressure and it is pulled through the analyzer 14 by the suction pump which is an integral part of the aforementioned flame-ionization unit. The secondary pump 132 does not operate during the span cycle or calibration period. The secondary sampling pump 132 runs only when one or more of the sampling line solenoid valves 128 through 128c are open and operating.

It will be understood that the holes 223 formed in the secondary nozzle 134 are made to a size to allow adequate passage of the gas sample without restriction into the secondary line 133. The holes are made small enough, however, to prevent entry of dirt particles which might tend to clog the secondary lines. The intake nozzle 134 is exposed to weather conditions and moisture and, accordingly, it must be constructed from a material which will resist corrosion and rust. Stainless steel is desirable, but brass will serve the purpose.

It is necessary to maintain a correct differential in vacuum between the primary sampling system and a secondary sampling system, and this is one of the reasons for using a universal type constant speed motor in the secondary pump 32 and the variable speed motor in the primary blower 114. Varying the speed of the blower 114 changes the rate of flow in the primary sampling line, however, this result could be achieved with a flow control valve in the suction line 110 between the suction blower 114 and the three-way sample distribution valve 101.

The primary sampling system functions to develop a negative pressure in the funnel 16 and the immediate area between the lower opening of the funnel and the surface that is being sampled for leakage. This negative pressure would be in relation to normal atmospheric pressure at any given period and it is necessary for the purpose of bringing the sample into contact with the secondary pick-up nozzle 134 at the throat of the funnel 16. Correct adjustment of the primary air flow can compensate for changes in barometric pressure, which affects the venting of gas leakage from the soil, and within reason, can counter the effects of surface drafts and winds which tend to deflect the venting gas as it leaves the soil. If the suction blower 114 is operated at too low a speed, the desired effect is not accomplished. If the speed of the blower 114 is too high, the sample can be drawn past the secondary pick-up nozzle 134 too rapidly to permit optimum transfer of the sample to the secondary pick-up line 133. This action would result in part due to the increased speed of the primary sample past the secondray pick-up and also to the counter action of the increased vacuum of the primary sample in relation to that of the secondary vacuum pump 132, which is constant.

In practice, the location of the secondary pick-up nozzle 134 in the funnel 16 and the correct operating speeds or voltage regulator setting for adjusting the speed of the primary blower 114 for various conditions are established by testing each of the sampling systems. The operating standards or settings are recorded and can be used by the operator as the various winds or barometric changes are encountered. The standards are determined by disposing the detecting unit over known gas leaks and adjusting the differential between the primary and secondary gas sampling systems until a maximum reading is made on the recorder. This calibration operation for setting the operating standards can be carried out under various wind and barometric pressure conditions and the proper settings recorded for future use.

The sampling system of the present invention provides flexibility in adjusting to changing weather conditions and increased sensitivity by reducing the dilution of the sample during transfer from the point of entry into the secondary sampling system and the point of detection in the gas analyzer 14. There is less dilution in the small diameter conduit 133 where the sample travels as an elongated slug, with only the small area at the front and rear of the slug exposed to the air that would tend to dilute it. In the large diameter conduit 17, a much greater area of the sample is exposed to dilution in proportion to the amount of the sample being conducted. This is a critical point in the determination of the efficiency of a sampling technique.

Two factors are involved in a sample technique. First, the amount of gas concentration in a sample that reaches the gas analyzer is indicated by the reading on the meter or the deflection of the stylus 182 on the chart paper 184. If the sample is diluted enroute from the point of pick-up to the instrument 14, the accuracy of the process is adversely affected. The other factor is the amount or volume of actual sample that is available as the sampling funnel 16 passes over a leak. If the leak is small and not spreading over a wide area as it passes through the soil from the source on the gas main, very little sample would be available during the time the intake funnel 16 passes over the leak. In this case, any dilution within the sampling system would tend to limit the ability of the mobile unit to detect small leaks. This point must be considered when the sampling boom does not pass directly over the center of the leak area. If the exact location of the gas main is not known, the sampling boom might pass over the outer perimeter of the area where gas is venting to the atmosphere. In this situation, not only is the concentration of the gas in the sample apt to be low, but the period of time that the sampling funnel 16 would be over a venting area is also reduced. Under these circumstances, it would be possible to miss a large leak if the sampling system was not efficient. These points illustrate the necessity of an efficient sampling method and apparatus as is disclosed in the present invention. The funnel 16 in the primary sampling system increases the scope or sampling area of the unit, while the secondary sampling system carries the gas sample to a point near the analyzer 14 with minimum dilution and in the shortest possible time.

It will be seen that the gas analyzer produced an indication of methane gas on the chart paper 184, and such indication can be quickly located relative to the land marks 185 because of the fifty foot markings 193 made on the chart paper 184.

The actual speed of the vehicle in feet per minute, and total footage covered are simultaneously recorded with the gas detections and a scale is established on the chart paper 184 which compensates for any variation in the speed of travel. Experience has shown that the mobile gas detecting unit of the present invention is an accurate and efficient detector.

It will be seen that the nozzle 134 for the secondary sampling system is disposed in the throat of the funnel 16 at a higher level than the lower intake end of the funnel 16. The point of intake of the primary sampling system thus is located at a point spaced below the point of intake of the secondary sampling system. For example, as shown in FIG. 14, in one embodiment the height of the connector pipe 221 was 2½", the height of the throat portion 220 was 4⅛", and the height of the intake portion 219 was 2⅜". The nozzle 134 extended down into the throat 220 for a distance of 2" and the lower end of the nozzle was thus about 4½" above the intake point or lower end of the funnel 16.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; and, a gas analyzer means connected to the discharge conduit of said second suction means for drawing a third gas sample from said secondary gas sample and measuring the concentration of said preselected gas in the third gas sample.

2. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; and, means for controlling said first suction means to maintain a vacuum differential between negative pressures of the primary and secondary gas samples.

3. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; and, an oxidizer means interposed between said gas analyzer means and the discharge conduit of said second suction means for eliminating non-selected gases from said third gas sample before it is analyzed by said gas analyzer means.

4. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the grounds; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; and, recording means operatively mounted in said vehicle, including a chart and a stylus, and being responsive to said analyzer means for recording the concentration of said preselected gas on said chart.

5. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; means for controlling said first suction means to maintain a vacuum differential between negative pressures of the primary and secondary gas samples; and, an oxidizer means interposed between said gas analyzer means and the discharge conduit of said second suction means for eliminating non-selected gases from said third gas sample before it is analyzed by said gas analyzer means.

6. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; means for controlling said first suction means to maintain a vacuum differential between negative pressures of the primary and secondary gas samples; an oxidizer means interposed between said gas analyzer means and the discharge conduit of said second suction means for eliminating non-selected gases from said third gas sample before it is analyzed by said gas analyzer means; and, recording means operatively mounted in said vehicle, including a chart and a stylus, and being responsive to said analyzer means for recording the concentration of said preselected gas on said chart.

7. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; means for controlling said first suction means to maintain a vacuum differential between negative pressures of the primary and secondary gas samples; and, recording means operatively mounted in said vehicle, including a chart and a stylus, and being responsive to said analyzer means for recording the concentration of said preselected gas on said chart.

8. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; an oxidizer means interposed between said gas analyzer means and the discharge conduit of said second suction means for eliminating non-selected gases from said third gas sample before it is analyzed by said gas analyzer means; and, recording means operatively mounted in said vehicle, including a chart and a stylus, and being responsive to said analyzer means for recording the concentration of said preselected gas on said chart.

9. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; recording means operatively mounted in said vehicle, including a chart and a stylus, and being responsive to said analyzer means for recording the concentration of said preselected gas on said chart; and, means responsive to the movement of said vehicle for marking a distance traveled reference scale on said chart whereby a continuous strip chart is produced which shows detected gas leaks in reference to the distance traveled by the vehicle.

10. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; an oxidizer means interposed between said gas analyzer means and the discharge conduit of said second suction means for eliminating non-selected gases from said third gas sample before it is analyzed by said gas analyzer means; recording means operatively mounted in said vehicle, including a chart and a stylus, and being responsive to said analyzer means for recording the concentration of said preselected gas on said chart; and, means responsive to the movement of said vehicle for marking a distance traveled reference scale on said chart whereby a continuous strip chart is produced which shows detected gas leaks in reference to the distance traveled by the vehicle.

11. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a flame ionization gas analyzer connected to the discharge conduit of said second suction means for drawing a third gas sample from said secondary gas sample and measuring the concentration of said preselected gas in the third gas sample; and, an oxidizer means interposed between said flame ionization gas analyzer and the discharge conduit of said second suction means for eliminating non-selected gases from said third gas sample before it is analyzed by said flame ionization gas analyzer.

12. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in the gas sample intake means and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; an oxidizer means interposed between said gas analyzer means and the discharge conduit of said second suction means for eliminating non-selected gases from said third gas sample before it is analyzed by said gas analyzer means; recording means operatively mounted in said vehicle, including a chart and a stylus, and being responsive to said analyzer means for recording the concentration of said preselected gas on said chart; and, said gas sample pick-up apparatus including a rigid conduit pivotally mounted on the front of said vehicle for pivotal movement about a vertical axis and a horizontal axis, one end of said rigid conduit being connected to said gas sample intake means and the other end being connected to the first suction means.

13. A mobile gas leakage detecting apparatus as defined in claim 12, wherein: said rigid conduit is connected to said gas sample intake means by a universally adjustable connection means which permits the gas sample intake means to move universally relative to said rigid conduit.

14. A mobile gas leakage detecting apparatus as defined in claim 12, including: a hydraulically operated power means for pivoting the gas sample pick-up apparatus about said horizontal axis.

15. A mobile gas leakage detecting apparatus as defined in claim 12, including: means for vertically adjusting said gas sample pick-up apparatus.

16. A mobile gas leakage detecting apparatus as defined in claim 12, including: means for normally biasing said gas sample pick-up apparatus into a first position and extendable to permit said gas sample pick-up apparatus to pivot about said vertical axis when said gas sample intake means hits an obstruction.

17. A mobile gas leakage detecting apparatus as defined in claim 12, wherein: a multiple inlet flow control valve is disposed between said other end of the rigid conduit and the first suction means for selective connection of said first suction means to a multiple number of gas sample pick-up apparatuses.

18. A mobile gas leakage detecting apparatus for detecting and charting the location of leaks of a preselected gas through the surface of the ground comprising: a vehicle adapted to move over the ground along a predetermined survey route; said vehicle being provided with at least one gas sample pick-up apparatus operatively mounted on the vehicle; said gas sample pick-up apparatus including a gas sample intake means disposed on a plane adjacent the ground; a first suction means for drawing a primary gas sample from the atmosphere through said gas sample pick-up apparatus and discharging the primary gas sample to the atmosphere; a second suction means for drawing a secondary gas sample from the primary gas sample in said gas sample pick-up apparatus and discharging the secondary gas sample to the atmosphere through a discharge conduit; a gas analyzer means connected to the discharge conduit of said second suction means for drawing a third gas sample from said secondary gas sample and measuring the concentration of said preselected gas in the third gas sample; an oxidizer means interposed between said gas analyzer means and the discharge conduit of said second suction means for eliminating non-selected gases from said third gas sample before it is analyzed by said gas analyzer means; recording means operatively mounted in said vehicle, including a chart and a stylus, and being responsive to said analyzer means for recording the concentration of said preselected gas on said chart; said gas sample pick-up apparatus including a rigid conduit pivotally mounted on the front of said vehicle for pivotal movement about a vertical axis and a horizontal axis, one end of said rigid conduit being connected to said gas sample intake means and the other end being connected to the first suction means; and, a tube mounted in said gas sample intake means and extending through said rigid conduit and being connected to said second suction means.

19. A mobile gas leakage detecting apparatus as defined in claim 18 wherein: said gas sample intake means comprises an inverted funnel shaped member with the large open end being disposed adjacent the ground.

20. A mobile gas leakage detecting apparatus as defined in claim 19, including: an intake nozzle attached to said tube mounted in the inverted funnel shaped member and being disposed in said funnel shaped member at a point spaced upwardly from the lower end thereof and being provided with a plurality of inlet holes.

21. A mobile gas leakage detecting apparatus as defined in claim 20, wherein: said intake nozzle comprises a vertically disposed cylindrical member which is closed at the lower end thereof and wherein said plurality of inlet holes are formed through the side walls of the cylindrical member in a direction transverse to the longitudinal axis of the same.

22. A mobile gas leakage detecting apparatus as defined in claim 21, including: means for controlling said suction means to maintain a predetermined vacuum differential between the negative pressures in the intake nozzle and the inverted funnel shaped member.

References Cited
UNITED STATES PATENTS

| | | |
|---|---|---|
| 778,451 | 12/1904 | Hartley et al. _____ 346—33 |
| 2,290,618 | 7/1942 | Bosomworth _____ 73—146 |
| 2,393,650 | 1/1946 | Metcalf _____ 73—23 |
| 2,834,113 | 5/1958 | En Dean et al. ____ 33—205.5 X |
| 2,879,663 | 3/1959 | Thomas _____ 73—26 |
| 3,107,517 | 10/1963 | Loyd et al. _____ 73—23 |
| 3,169,389 | 2/1965 | Green et al. _____ 73—23.1 |

RICHARD C. QUEISSER, *Primary Examiner.*

JAMES J. GILL, *Examiner.*

J. FISHER, C. I. McCLELLAN, *Assistant Examiners.*